US005194317A

United States Patent [19]

Sato et al.

[11] Patent Number: 5,194,317

[45] Date of Patent: Mar. 16, 1993

[54] INK JET RECORDING SHEET

[75] Inventors: Kazuo Sato; Minoru Sone, both of Tokyo, Japan

[73] Assignee: Nisshinbo Industries, Inc., Nihonbashi, Japan

[21] Appl. No.: 736,777

[22] Filed: Jul. 29, 1991

[30] Foreign Application Priority Data

Aug. 3, 1990 [JP] Japan .................................. 2-205183
Apr. 12, 1991 [JP] Japan .................................. 3-106429

[51] Int. Cl.$^5$ .............................................. B32B 9/00

[52] U.S. Cl. .................................... 428/195; 428/212; 428/327; 428/402

[58] Field of Search ................ 428/195, 327, 402, 212

[56] References Cited

U.S. PATENT DOCUMENTS 4,481,252 11/1984 Postle et al. ........................ 428/323
4,903,039 2/1990 Light .................................... 346/1.1
4,908,271 3/1990 Kasai et al. ...................... 428/402.22

*Primary Examiner*—Patrick J. Ryan
*Assistant Examiner*—W. Krynski
*Attorney, Agent, or Firm*—Rogers & Killeen

[57] ABSTRACT

An ink jet recording sheet comprises a base material made of a transparent plastic film and an ink fixing layer having a pigment fixed by a binder so that an image formed on the ink fixing layer is seen from the side of the base material, wherein the pigment in the ink fixing layer comprises beads of polystyrene or a copolymer thereof. The recording sheet produces a clear image having an excellent color density and no ink bleeding and the like.

8 Claims, No Drawings

INK JET RECORDING SHEET

BACKGROUND OF THE INVENTION

1. Field of the Invention

The present invention relates to a recording sheet used for an ink jet printer for printing monochrome and full color images at a high speed by discharging fine droplets of water-color ink, oil-based ink or the like from a nozzle.

2. Description of Related Art

Although examples of recording methods include a heat melting method, a sublimation method, an electrophotographic method, an ink jet method and the like, the ink jet recording method has recently been popularized because of its silence during recording, property of high-speed recording, ease of color recording, suitability for recording a large image and so on.

Quality requirements for such an ink jet recording sheet are the following:

(1) Having excellent ink absorptivity and producing no bleeding and the like.

(2) Having excellent smoothness and glossiness.

(3) Having water resistance and producing an image having water resistance and no bleeding and flowing-out even if moisture adheres thereto.

(4) Producing no sagging even if the sheet absorbs a large quantity of ink.

(5) Producing an image having an excellent color density and sharpness. Various improved techniques have previously been developed for satisfying the above quality requirements.

When an image formed by ink jet recording is displayed outdoors by a back light method, generally, a plastic film is laminated on the print surface thereof, or a water-resisting coating is provided on the surface because the unprocessed or untreated image cannot satisfy the water resistance of the above quality requirement (3). There is also the problem that much trouble is required for bonding another support material such as paper or the like, which has a high level of opacity, to the rear side of an image in order to improve the color density and sharpness thereof described in the quality requirement (5). In this case, the opacity is 60% or more, preferably 80% or more.

SUMMARY OF THE INVENTION

Accordingly, it is an object of the present invention to solve the above problem and provide an ink jet recording sheet used for a back light method which satisfies the above quality requirements (1) to (5) without being subjected to the above treatment even when a recorded image is displayed outdoors or seen as a print indoors, and which can be easily produced at low cost.

To this end, the present invention provides an ink jet recording sheet comprising a base material made of a transparent plastic film, an ink fixing layer provided on the base material and having a pigment fixed by a binder so that the image formed on the ink fixing layer is seen from the base material side, wherein the pigment in the ink fixing layer consists of beads of polystyrene or a copolymer thereof.

As a result of energetic investigation conducted by the inventor with a view to solving the above problem, the inventor found that, when an image printed on the porous ink fixing layer provided on a base material made of a transparent plastic film by using an ink jet printer is seen from the base material side, beads of polystyrene or a copolymer thereof or hollows beads thereof having appropriate transparency, a refractive index which is as high as 1.59 to 1.60 and no ink absorptivity in itself is effective for increasing the color density without producing any troubles such as ink bleeding, flowing-out and the like. The present invention has been achieved on the basis of the finding.

DESCRIPTION OF PREFERRED EMBODIMENTS

The present invention is described in detail below.

The recording sheet of the present invention is obtained by the following method:

A transparent thermoplastic resin film, a polyvinyl alcohol film, a cellulose derivative film, a stretched film thereof or the like is used as the transparent plastic film for the base material.

Examples of thermoplastic resin films that may be used include films of polyethylene terephthalate, polypropylene, polystyrene, polyvinyl chloride, polymethyl methacrylate, polyethylene, polycarbonate and the like; films each having an undercoat layer provided for improving adhesion between the resin surface and the ink fixing layer; films subjected to corona discharge treatment.

A pigment is then fixed to the base material by a binder to form the ink fixing layer. Examples of binders that can be used include starch such as oxidized starch, esterified starch and the like; cellulose derivatives such as carboxymethyl cellulose, hydroxyethyl cellulose and the like; casein; gelatin; soybean protein; polyvinyl alcohol and derivatives thereof; latexes of conjugated diene polymers such as styrene-butadiene copolymers, methyl methacrylate-butadiene copolymers and the like; latexes of acrylic polymers such as acrylate and methacrylate polymer and copolymers; latexes of vinyl copolymers such as vinyl chloride-vinyl acetate copolymers and the like.

Each of the polystyrene beads used as the pigment preferably has a completely spherical form because of its excellent transparency. When such polystyrene beads are used in the ink fixing layer, the layer formed has appropriate opacity which is caused by the voids produced between the respective beads. Either crosslinked-type or uncrosslinked-type polystyrene beads can be used. The crosslinked-type polystyrene beads have a degree of crosslinking of 5 to 80%, preferably 40 to 50%. Although polystyrene beads having a particle size of 4 to 100 μm can be used, polystyrene beads having a particle size of 20 μm or less are preferable in view of the smoothness of the sheet and ink permeability and the like. Hollow beads are preferable for improving opaqueness and whiteness because light scattering is produced by the resin layer and the inner air due to the hollow form of the beads although such hollow beads of polystyrene or a copolymer thereof are made of transparent resin. Since completely spherical hollow beads have no ink absorptivity, they are preferable because ink sufficiently permeates into the binder resin. In this case, because the opaqueness caused by the voids produced between the respective beads is added to the opaqueness caused by the hollowness of the beads, a clearer image is obtained. Although beads having a particle size of 0.1 to 100 μm can be used, beads having a particle size of 20 μm or less are preferable in view of the smoothness of the sheet and ink permeability. Beads of styrene-maleate copolymer or hollow beads thereof can also be used in the same way as that described above. Although porous beads can also be used, the beads are ineffective to the purpose of causing the ink on the ink fixing layer to reach the interface between the base material and the ink fixing layer and the purpose of producing an excellent color density when the image formed is seen from the base material side because the beads have ink absorptivity, like inorganic pigments such as silica, calcium carbonate, diatomaceous earth and the like. It is thus undesirable to use such porous beads.

On the other hand, polystyrene shows a refractive index of as high as 1.59 to 1.60, while other various plastic beads show the following refractive index values:

polyethylene (1.51), urea resin (1.54–1.56), polyester (1.52–1.57), vinyl chloride (1.54–1.55), vinyl acetate (1.45–1.47), polyvinyl alcohol (1.49–1.58), methyl methacrylate (1.49), nylon (1.53) This causes the polystyrene beads to produce an excellent color density. In addition, since polystyrene has excellent transparency and can be easily formed into a completely spherical shape by using a suspension polymerization process and can be controlled to various particle sizes, the use of the polystyrene beads is optimum for achieving the object of the present invention. Although methyl methacrylate can also be formed into transparent particles having a completely spherical shape, it is undesirable because it shows a refractive index lower than that of polystyrene and thus shows an OD (Optical Density) value which is measured from the base material side and lower than that of polystyrene. In addition, a sheet comprising the hollow beads has sufficient opacity because light scattering takes place at the interface between each of the hollow beads and the inner air thereof. This provides an image with excellent color density and sharpness.

A coating solution obtained by dispersing polystyrene beads in the binder is coated on the base material made of a transparent plastic film by a known method and then dried to form a recording sheet of the present invention. If required, the thus-formed sheet may be subjected to antistatic treatment.

The ink jet recording sheet of the present invention comprises the ink fixing layer having a porous structure filled with the spherical polystyrene beads. Since the recording sheet has excellent ink permeability, and since ink is not absorbed by the beads in the process of ink permeation, excellent color properties are exhibited when the image printed is seen from the base material side.

Further, since the porous structure formed by the polystyrene beads used in the present invention has excellent ink permeability and fixing properties, there is no need for a multi-layer structure comprising an ink permeating layer and an ink fixing layer, as in prior art, the above-described effects can be obtained even by a single-layer structure.

On the other hand, because the recording sheet of the present invention has a structure designed for seeing it from the base material side, the print surface to be seen shows the excellent glossiness possessed by the plastic used and has excellent water resistance and friction resistance. In addition, because each of the polystyrene beads used in the present invention has excellent transparency, the whole sheet has opacity which allows the light used in the back light method to appropriately transmit through the sheet. The recording sheet is thus optimum for use in the back light method.

Even if no light is used, the image printed can be seen without losing the quality. As occasion demands, another supporting material having a high degree of opacity may be adhered to the side of the ink fixing layer after printing for the purpose of improving the opacity. In this case, the supporting material used is not particularly limited, and any materials such as paper, plastics, metals, glass and the like can be used so far as they have appropriate smoothness.

EXAMPLE

Examples of the present invention are described below.

EXAMPLE 1

50 parts of spherical polystyrene beads (SB-8, uncrosslinked type, refractive index 1.59, produced by Sekisui Kaseihin Kogyo K. K.) having an average particle size of 8 μm were added to 120 parts by weight of 6% aqueous polyvinyl alcohol solution and then dispersed therein by a pot mill for 24 hours. A thickener and the like were added to the resultant dispersion to form a coating solution.

The thus-formed coating solution was coated on the surface of a transparent polyester film having a thickness of 100 μm and having a transparent undercoat layer by using a 3-mil applicator and then dried in a constant-temperature dryer at 90° C. for 3 minutes to obtain a recording sheet. The thus-obtained recording sheet had a surface layer having a thickness of 30 μm. When the recording sheet was observed under an electron microscope, a porous structure filled with polystyrene spherical particles was observed.

A full solid color bar having yellow, magenta, cyan black colors was printed on the surface layer of the the recording sheet obtained by the above method by using an ink jet printer (CJ-5700A produced by Sanyo Electric Co., Ltd.). When the recording sheet was seen from the base material side, a clear image having no ink bleeding and flowing-out, a high color density and excellent glossiness possessed by the polyester film was observed. As a result of measurement of the OD value of the black full solid portion, a high value of 1.71 was obtained. As a result of measurement of the OD value of a black full solid portion of a image printed on general ink jet paper which was commercially available under the same conditions as those described above, the OD value was 1.48.

In addition, when the recording sheet was observed from the base material side by using the light generated from a fluorescent lamp placed on the side of the ink fixing layer, appropriate transmitted light and a clear image were observed.

EXAMPLE 2

45 parts of spherical polystyrene beads (SBX-8, crosslinked type, degree of crosslinking 50%, refractive index 1.60, produced by Sekisui Kaseihin Kogyo K. K.) having an average particle size of 8 μm were added to 120 parts by weight of 6% aqueous polyvinyl alcohol solution and then dispersed therein by a pot mill for 24 hours. A thickener and the like were added to the resultant dispersion to form a coating solution.

The thus-formed coating solution was coated on the surface of a transparent polypropylene film having a thickness of 50 μm and having a transparent undercoat layer by using a 3-mil applicator and then dried in a constant-temperature dryer at 90° C. for 3 minutes to obtain a recording sheet. The thus-obtained recording sheet had a surface layer having a thickness of 32 μm. When the recording sheet was observed under an electron microscope, a porous structure filled with polystyrene spherical particles was observed.

An image was printed on the surface layer of the recording sheet obtained by the same method under the same conditions as those described above. When the recording sheet was seen from the base material side, a clear image was observed as in Example 1. As a result of measurement of the OD value of the black full solid portion, a high value of 1.70 was obtained.

COMPARATIVE EXAMPLE 50 parts of spherical polymethyl methacrylate beads (MB-8, uncrosslinked type, refractive index 1.49, produced by Sekisui Kaseihin Kogyo K. K.) having an average particle size of 8 μm were added to 120 parts by weight of 6% aqueous polyvinyl alcohol solution and then dispersed therein by a pot mill for 24 hours. A thickener and the like were added to the resultant dispersion to form a coating solution in the same way as in Example 1. A recording sheet was produced under the same conditions as those in Example 1 and then subjected to printing. As a result of measurement of the OD value of a black full solid portion, the OD value was 1.56.

EXAMPLE 3

5 parts of spherical polystyrene beads (SBX-2, crosslinked type, degree of crosslinking 50%, refractive index 1.60, produced by Sekisui Kaseihin Kogyo K. K.) having an average particle size of 12 μm and 10 parts of acrylic-styrene copolymer spherical hollow beads (Ropake OP-84J, emulsion, solid content 42.5%, produced by ROHM AND HAAS Co., Ltd.) having an average outer diameter of 0.55 μm and an average inner diameter of 0.3 μm were added to 40 parts of modified polyester resin (NT-3, solution produced by Takamatsu Yushi K. K.), and then dispersed therein by using a pot mill for 24 hours. A thickener and the like were then added to the resultant dispersion to form a coating solution. The thus-formed coating solution was coated on the surface of a transparent polypropylene film having a thickness of 50 μm by using a 3-mil applicator and then dried for 3 minutes in a constant-temperature dryer at 90° C. to obtain a recording sheet. The surface layer formed had a thickness of 29 μm. As a result of observation under an electron microscope, a porous structure filled with polystyrene spherical particles and acrylic-styrene copolymer hollow beads was observed.

When an image was printed on the surface layer of the recording sheet by the same method as that employed in Example 1 under the same conditions and seen from the base material side, a clear image was observed in the same way as in Example 1. As a result of measurement of the opaqueness of the recording sheet, the value of opaqueness was 86.7%.

What is claimed is:

1. An ink jet recording sheet comprising a base material made of transparent plastic film and an ink fixing layer having a pigment fixed by a binder so that an image formed on said ink fixing layer is seen from the side of said base material, wherein said pigment in said ink fixing layer comprises beads of polystyrene or copolymers of styrene and carboxylated vinyl monomers, said beads having a weight that is between about four and seven times the weight of said binder, a size between about 0.1 μm and 100 μm and a refractive index of about 1.59 to 1.6 so that said recording sheet is not transparent.

2. An ink jet recording sheet according to claim 1, wherein said beads are hollow.

3. The sheet as defined in claim 1 wherein said beads are polystyrene and have diameters between about 4 μm and 20 μm.

4. The sheet as defined in claim 3 wherein said ink fixing layer has a thickness greater than the diameters of said beads.

5. An ink jet recording sheet having an ink fixing layer on a first surface of a transparent plastic film, the ink fixing layer having an exposed a real portion that is to be illuminated so that images recorded in said ink fixing layer by an ink jet printer may be viewed from a second surface of the transparent plastic film opposite said first surface, wherein the ink fixing layer comprises:

a binder on said first surface of the transparent plastic film for absorbing ink from an ink jet printer and having a thickness so that images made by the absorbed ink may be viewed from the second surface of the transparent plastic film; and beads of polystyrene or copolymers of styrene and carboxylated vinyl monomers dispersed in said binder, said beads having, (a) a size of 0.1 μm to 100 μm, the size being less than the thickness of said binder so that the exposed surface of said ink fixing layer not contacting the transparent plastic film facilitates absorption of ink from the ink jet printer, (b) a refractive index of about 1.59 to 1.6, the index being greater than the refractive index of said binder, and (c) a weight that is between about four and seven times the weight of said binder.

6. The ink jet recording sheet as defined in claim 5 wherein said beads comprise polystyrene beads that have a degree of crosslinking of 5 to 80%.

7. The ink jet recording sheet as defined in claim 6 wherein said polystyrene beads have a degree of crosslinking of 40 to 50%.

8. The sheet as defined in claim 5 wherein said beads are polystyrene and have diameters between about 4 μm and 20 μm.

* * * * *